(12) United States Patent
Isaacson et al.

(10) Patent No.: US 11,348,155 B2
(45) Date of Patent: May 31, 2022

(54) STEP THROUGH PROCESS OF GENERATING CUSTOM JEWELRY

(71) Applicant: Diamonds Direct, LC, Draper, UT (US)

(72) Inventors: Matt Jeffrey Isaacson, Saratoga Springs, UT (US); William Edwin Rappleye, III, Draper, UT (US); Mehulkumar K. Thakkar, Pune (IN)

(73) Assignee: DIAMONDS DIRECT, LC, Draper, UT (US)

( * ) Notice: Subject to any disclaimer, the term of this patent is extended or adjusted under 35 U.S.C. 154(b) by 34 days.

(21) Appl. No.: 16/886,516

(22) Filed: May 28, 2020

(65) Prior Publication Data
US 2021/0374820 A1 Dec. 2, 2021

(51) Int. Cl.
*G06Q 30/06* (2012.01)
*G06Q 30/02* (2012.01)
*G06F 16/9535* (2019.01)
*G06F 16/54* (2019.01)
*G06F 3/0482* (2013.01)
(Continued)

(52) U.S. Cl.
CPC ....... *G06Q 30/0621* (2013.01); *G06F 3/0482* (2013.01); *G06F 16/54* (2019.01); *G06F 16/9535* (2019.01); *G06Q 10/0875* (2013.01); *G06Q 30/0206* (2013.01); *G06Q 30/0643* (2013.01); *G06Q 50/04* (2013.01)

(58) Field of Classification Search
CPC .......... G06Q 30/0621; G06Q 30/0206; G06Q 30/0643; G06Q 10/0875; G06Q 50/04; G06F 16/54; G06F 16/9535; G06F 3/0482

USPC ...................... 705/26.1, 27.2, 26.5
See application file for complete search history.

(56) References Cited

U.S. PATENT DOCUMENTS 7,284,007 B1 * 10/2007 Francicus de Heer ...................... G06Q 30/0603
10,810,647 B2 * 10/2020 Jain .......................... G06T 11/00
(Continued)

FOREIGN PATENT DOCUMENTS

| CN | 113052652 A * | 6/2021 | ............. G06Q 30/06 |
| JP | 2002215715 A * | 8/2002 | ............. G06F 16/50 |
| WO | WO-9308664 A1 * | 4/1993 | ........... G11B 27/034 |

OTHER PUBLICATIONS

Article, "On Web, Workshops to Create One-of-a-Kind Gifts", published in New York Times (Online) on Dec. 22, 2009; retrieved from Dialog database on Jan. 4, 2022.*

*Primary Examiner* — Yogesh C Garg
(74) *Attorney, Agent, or Firm* — Workman Nydegger

(57) ABSTRACT

A server for generating custom jewelry through a step-by-step customization process can be configured to send display instructions over a network to display a plurality of available selections for a first customization option at a remote computer system. The server can also access a first product photo based on a user selection at the remote computer system of an available selection for the first customization option. Further, the server can send display instructions over a network to display a plurality of available selections for a second customization option at the remote computer system. The server can then access an updated product photo based on a user selection at the remote computer system of an available selection for the second customization option. Finally, the server can send over the network display instructions to the remote computer system for the updated product photo.

20 Claims, 6 Drawing Sheets

(51) Int. Cl.
*G06Q 10/08* (2012.01)
*G06Q 50/04* (2012.01)

(56) References Cited

U.S. PATENT DOCUMENTS

| | | | |
|---|---|---|---|
| 2011/0153463 A1* | 6/2011 | Lovelace | G06Q 30/0641 |
| | | | 705/27.1 |
| 2012/0331422 A1* | 12/2012 | High | G06Q 50/00 |
| | | | 715/849 |
| 2013/0173040 A1* | 7/2013 | Wells | G06F 30/20 |
| | | | 700/98 |

\* cited by examiner

STEP THROUGH PROCESS OF GENERATING CUSTOM JEWELRY

BACKGROUND OF THE INVENTION

Custom jewelry provides a customer the opportunity to express their individual style and personality. However, most jewelry retailers may be limited in the number of combinations they can offer the customer by their supplier of the components of the jewelry. A jewelry retailer may not offer customization options outside those offered by their source manufacturer.

Further, most jewelry retailers may not produce and show the customer a product photo with the customer's selected customizations. In some cases, a jewelry retailer may show the customer a three-dimensional rendering of a custom piece of jewelry. Three-dimensional renderings, however, lack the detail an actual photo of the product offers. If the jewelry retailer does produce a product photo, the photo typically comprises a few photos of the limited customizations cut together at the end of the customization process.

The number of available permutations in available materials, finishes, and jewels makes showing more than a limited number of finished photo combinations impractical, and jewelers tend to rely on computerized renderings to suggest the look of a finished product. Computerized renderings, however, are often easily perceptible to the human eye, and still suffer from the difficulty of meeting the expectations of the end product.

Accordingly, there are a number of problems in the art that can be addressed.

BRIEF SUMMARY OF THE INVENTION

Implementations of the present invention provide systems, methods and computer program products directed to improving the custom jewelry design process. For example, a system in accordance with at least one implementation of the present invention can comprise a server for generating custom jewelry through a step-by-step customization process. Additionally, a computerized method for use on a server can comprise generating custom jewelry through a step-by-step customization process. Accordingly, implementations of the present invention improve the process of designing custom jewelry.

For example, a server for generating custom jewelry through a step-by-step customization process can be configured to send display instructions over a network to display a plurality of available selections for a first customization option at a remote computer system. The server can also access a first product photo based on a user selection at the remote computer system of an available selection for the first customization option. Further, the server can send display instructions over a network to display a plurality of available selections for a second customization option at the remote computer system. The server can then access an updated product photo based on a user selection at the remote computer system of an available selection for the second customization option, wherein the available selection for the second customization option corresponds to a second product photo, and the updated product photo combines at least a portion of the first product photo and at least a portion of the second product photo so that the updated product photo appears to be an original photo. Finally, the server can send over the network display instructions to the remote computer system for the updated product photo.

In addition, a computerized method for use on a server can comprise providing display instructions to a remote computer over a network to display at least a first customization option comprising a first set of a plurality of available selections. The method can also include upon selection received from the remote computer system, accessing a product photo based on a user selection of the first customization option. The method can further comprise filtering at least one available selection option of at least a second customization option based on the user selection of the at least the first customization option to limit the second customization option to a second set of a plurality of available selections. The method can comprise providing display instructions for the at least the second customization option. Also, the method can include accessing the updated product photo based on a user selection of the at least the second customization option such that the updated product photo combines visual elements of the user selection of the at least the first customization option and the user selection of the at least second customization option. Finally, the method can comprise providing display instructions for the updated product photo.

Similarly, a server for generating custom jewelry through a step-by-step customization process can comprise instructions that, when executed, cause the system to perform a method of providing display instructions for at least a first customization option. The method can include accessing a product photo based on a user selection of the at least the first customization option and generating a price estimate based on the user selection of the at least the first customization option. The method can also comprise providing display instructions for at least a second customization option. Further, the method can include accessing the updated product photo based on a user selection of the at least the second customization option such that the updated product photo layers visual elements of the user selection of the at least the first customization option and the user selection of the at least the second customization option. The method can include updating the price estimate based on the user selection of the at least the second customization option. Finally, the method can comprise providing display instructions for the updated product photo and the updated price estimate.

Additional features and advantages will be set forth in the description which follows, and in part will be obvious from the description, or may be learned by practice. The features and advantages may be realized and obtained by means of the instruments and combinations particularly pointed out in the appended claims. These and other features will become more fully apparent from the following description and appended claims or may be learned by the practice of the examples as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
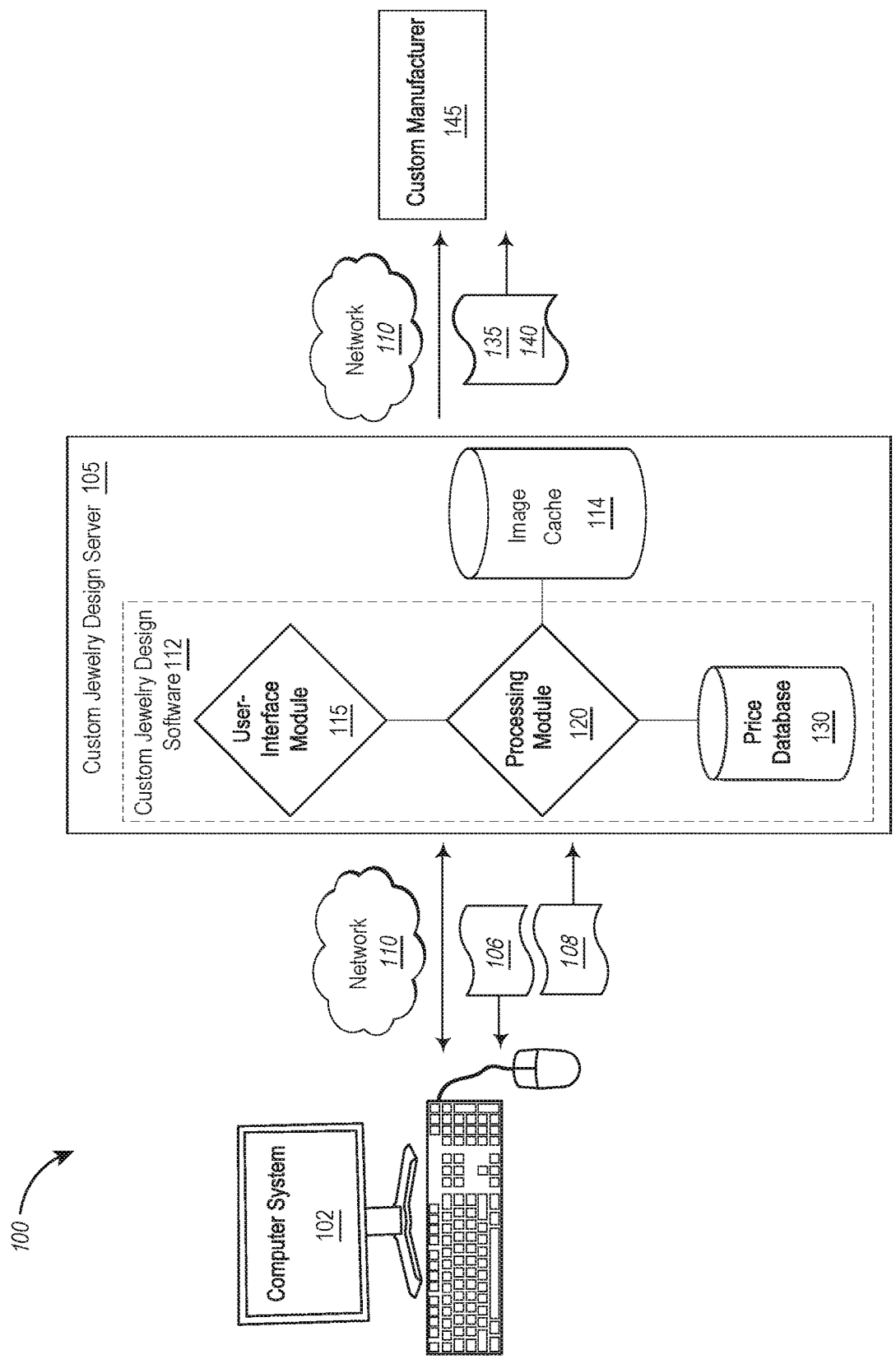
FIG. 1 depicts a schematic of a computerized system for generating custom jewelry through a step-by-step process.

Implementations of the present invention provide systems, methods and computer program products directed to improving the custom jewelry design process. For example, a system in accordance with at least one implementation of the present invention can comprise a server for generating custom jewelry through a step-by-step customization process. Additionally, a computerized method for use on a server can comprise generating custom jewelry through a step-by-step customization process. Accordingly, implementations of the present invention improve the process of designing custom jewelry.

For example, a server for generating custom jewelry through a step-by-step customization process can be configured to send display instructions over a network to display a plurality of available selections for a first customization option at a remote computer system. The server can also access a first product photo based on a user selection at the remote computer system of an available selection for the first customization option. Further, the server can send display instructions over a network to display a plurality of available selections for a second customization option at the remote computer system. The server can then access an updated product photo based on a user selection at the remote computer system of an available selection for the second customization option, wherein the available selection for the second customization option corresponds to a second product photo, and the updated product photo combines at least a portion of the first product photo and at least a portion of the second product photo so that the updated product photo appears to be an original photo. Finally, the server can send over the network display instructions to the remote computer system for the updated product photo.

Unlike traditional jewelry retailers who can be limited in the number of combinations they can offer a customer, implementations of the present invention can provide customization options outside those offered by conventional source manufacturers. In particular, implementations of the present invention can increase numbers of customization options available to a customer because jewelry is made by a custom manufacturer. In at least one implementation of the present invention, details outlining the user's selections of customization options are sent to the custom manufacturer for production.

Further, in contrast to most jewelry retailers, in at least one implementation of the present invention the user can view a product photo displaying their selected customizations. The product photo can be updated as the customer chooses subsequent available options. The product photo can be a stitched image comprising images of all the user's chosen available selections.

The computerized system of the present invention, in at least one implementation, can filter available selections for a customization option based on the user's previous selection of an available selection for a previous customization option. Such filtering can prevent the user from choosing an impossible combination of available selections.

In at least one implementation, the user can view how their selected customizations affect the price of a piece of jewelry. Like the product photo, a price estimate can be updated as the customer chooses subsequent available options. The computerized system can include a price database that comprises price per weight measurements for materials included as available selections for a customization option. In at least one implementation, the price database receives regular (e.g., hourly, daily, or weekly) price per weight measurement for materials included as available selections.

Accordingly, implementations of the present invention can improve the custom jewelry design process by providing the user with a realistic product photo throughout the customization process. In at least one implementation, the user can see exactly how their customization selections affect the appearance of the piece of jewelry in photo realistic form even though that customization was never formally photographed. Similarly, implementations of the present invention allow the user to see how their customization selections affect the price of the piece of jewelry. Systems and methods of the present invention can also guide the user through the customization process and filter any impossible combinations.

Turning now to the Figures, FIG. 1 depicts a schematic of a system 100 for generating custom jewelry through a step-by-step process. As shown, a computer system 102 communicates with a custom jewelry design server 105, such as over network 110. One skilled in the art will appreciate that the depicted schematic is merely exemplary, and although the computer system 102 is depicted in FIG. 1 as a desktop computer, the computer system 102 can take a variety of forms. For example, the computer system 102 can be a laptop computer, a tablet computer, a wearable device, a mobile phone, a mainframe, etc. As used herein, the term "computer system" includes any device, system, or combination thereof that includes one or more processors, and a physical and tangible computer-readable storage medium comprising computer-executable instructions that are executable by the one or more processors.

As shown in FIG. 1, the custom jewelry design server 105 can comprise one or more computer-readable storage media having stored thereon executable instructions that when executed by one or more processors configure the custom jewelry design server 105 to execute software custom jewelry design software 112. The one or more processors can comprise an integrated circuit, a field-programmable gate array (FPGA), a microcontroller, an analog circuit, or any other electronic circuit capable of processing input signals (not shown). The memory can be physical system memory, which can be volatile, non-volatile, or some combination of the two. The term "memory" can also be used herein to refer to non-volatile mass storage such as physical storage media. Examples of computer-readable physical storage media include RAM, ROM, EEPROM, solid state drives ("SSDs"), flash memory, phase-change memory ("PCM"), optical disk storage, magnetic disk storage or other magnetic storage devices, or any other hardware storage device(s). The computer system 102 can be distributed over a network environment and can include multiple constituent computer systems.

The custom jewelry design software 112 can comprise various modules, such as a user-interface module 115 and a processing module 120, as shown in FIG. 1. As used herein, a module can comprise a software component, including a software object, a hardware component, such as a discrete circuit, a FPGA, a computer processor, or some combination of hardware and software. One will understand, however, that other components and modules can be combined, associated, or separated in ways other than shown in FIG. 1 and still accomplish the purposes of the custom jewelry design server 105. Accordingly, the modules 115 and 120 of FIG. 1 are only shown for illustrative and exemplary purposes.

In at least one implementation, the user-interface module 115 comprises a user interface 200 (shown in FIGS. 2A and 2B) that allows the user to create, modify, analyze, and optimize customization options (e.g., material, profile, ring weight, ring width, ring size, finish, outside feature, etc.). For example, the user-interface module 115 can send display instructions 106 over the network 110 and thereby display images and graphical controls to the user through the illustrated computer monitor. In at least one implementation, the user-interface module 115 can receive user input 108 through a keyboard and/or mouse of the computer system 102. Accordingly, the user can utilize the computer system 102 to communicate with the user-interface module 115 and interact with customization options to create a piece of jewelry.

The user interface 200 provided through the user-interface module 115 can guide the user through a step-by-step customization process (e.g., FIGS. 2A-2B) by displaying a first customization option and allowing the user to make a selection from available selections for the first customization option. In at least one implementation, the user-interface module can send display instructions 106 to the computer system 102 over the network 110 to display at least a first customization option comprising a first set of a plurality of available selections. For example, the user interface 200 can prompt the user to choose a material (the customization option) for the piece of jewelry. In at least one implementation, the user can choose from a wide variety of metals, including titanium, cobalt chrome, zirconium, tantalum, Damascus, yellow gold, white gold, rose gold, etc (the available selections). The user can have the option of choosing the fineness of the selected metal, e.g., 10K yellow gold, 14K yellow gold, 18K yellow gold, etc. Additionally, the user can have the option of choosing the pattern of the selected metal, e.g., woodgrain Damascus, marble Damascus, basketweave Damascus, etc. One skilled in the art will appreciate that the materials are not limited to the materials or options listed above. In at least one implementation, the user can choose an organic material. Further, the customization options are not limited to a particular order; material may not be the first customization option.

In at least one implementation, the user interface 200 filters the plurality of available selections for an additional customization option based on the user selection at the computer system 102 of the available selection for the first customization option. Certain available selections for the additional customization option may not be possible based on the user's selection of a previous customization option. For example, the available selections for the polish can be filtered based on the user's selection of the material. Certain polishes may not be possible with the selection of the material, and therefore, the user interface 200 only shows the possible combinations.

In at least one implementation, before beginning the step-by-step customization process, the user can identify one or more primary characteristics desired in their piece of jewelry. Based on the primary characteristic(s) identified by the user, the user interface 200 can modify the customization options and/or available selections for a customization option.

As shown in FIG. 1, the processing module 120 can be in communication with an image cache 114 and a price database 130. As used herein, a database can comprise locally stored data, remotely stored data, data stored within an organized data structure, data stored within a file system, or any other stored data that is accessible to the custom jewelry design server 105.

The image cache 114 can comprise various modules configured to stitch, cache, and/or store images of each of the available selections (not shown). The image cache 114 can store cached stitched images of various combinations of available selections already stitched into product photos. The image cache 114 can layer, flatten, and cache multiple cached edited photos and into a product photo 260 (shown in FIGS. 4A-4D) comprising the requested available selections. The image cache 114 can determine the order in which the multiple cached edited photos are layered using a predetermined layering protocol.

Although in FIG. 1 the image cache 114 is shown outside the custom jewelry design software 112, the present invention is not so limited. In at least one implementation the image cache 114 is included in the custom jewelry design software 112. Further, the image cache 114 can be housed in an image caching server within a content delivery network (not shown).

The price database 130 can include price per weight measurements for materials included as available selections for the material. In at least one implementation, the price database 130 receives, via a network connection 110, regular (e.g., hourly, daily, or weekly) price per weight measurement for materials included as available selections for the material. For example, the price database 130 can include current price per weight measurements for 10K yellow gold, 14K yellow gold, 18K yellow gold, platinum, titanium, diamond, sapphire, ruby, etc.

As shown in FIG. 1, following the user's selection of at least one available selection for the customization option, data regarding the user's selection can be sent from the user-interface module 115 to the processing module 120. The processing module 120 can communicate with the image cache 114 to access a product photo 260 based on the requested at least one available selection for the customization option (shown in FIG. 2A). The product photo 260 can comprise a single edited photo comprising the requested at least one available selection. Additionally or alternatively, the product photo 260 can comprise multiple stitched edited photos comprising an element of the requested at least one available selection.

As shown in FIG. 1, the processing module 120 can send the product photo 260 to the user-interface module 115. The user-interface module 115 can send over the network 110 display instructions 106 for the product photo 260 to the computer system 102 so the user can see how the selected available selection(s) would look as a piece of jewelry. Additionally or alternatively, the processing module 120 can send display instructions for the product photo 260 to the computer system 102 directly.

The user-interface module 115 can be further configured to send display instructions 106 over the network 110 to display a plurality of available selections for an additional customization option at the computer system 102. FIG. 1 shows that following the user's selection of at least one available selection for the additional customization option, data regarding the user's selection can again be sent from the user-interface module 115 to the processing module 120. The processing module 120 can communicate with the image cache 114 to access an updated product photo 260 based on the user selection of the at least one available selection for the additional customization option (shown in FIG. 2B). The image cache 114 can include edited photos comprising a single available selection for a customization option and edited photos comprising multiple available selections for multiple customization options. Therefore, the updated product photo 260 can comprise a single edited photo comprising the requested at least one available selection for the customization option and the requested at least one available selection for the additional customization option.

The at least one available selection for the additional customization option can correspond to a second product photo. Accordingly, the updated product photo 260 based on the user selection of the at least one available selection for the additional customization option can combine at least a portion of the first product photo and at least a portion of the second product photo so that the updated product photo appears to be an original photo. In other words, the updated product photo 260 can comprise multiple stitched edited photos each comprising an element of the requested at least one available selection for the customization option and/or the requested at least one available selection for the additional customization option.

As with the product photo 260 based on the user's selection of the at least one available selection for the customization option, the processing module 120 can send the updated product photo 260 based on the user's selection of the at least one available selection for the additional customization option to the user-interface module 115. The user-interface module 115 can send over the network 110 display instructions 106 for the updated product photo 260 to the computer system 102 so the user can see how the selected available selection(s) would look as a piece of jewelry. Additionally or alternatively, the processing module 120 can send display instructions for the product photo 260 to the computer system 102 directly.

Figure 2A:
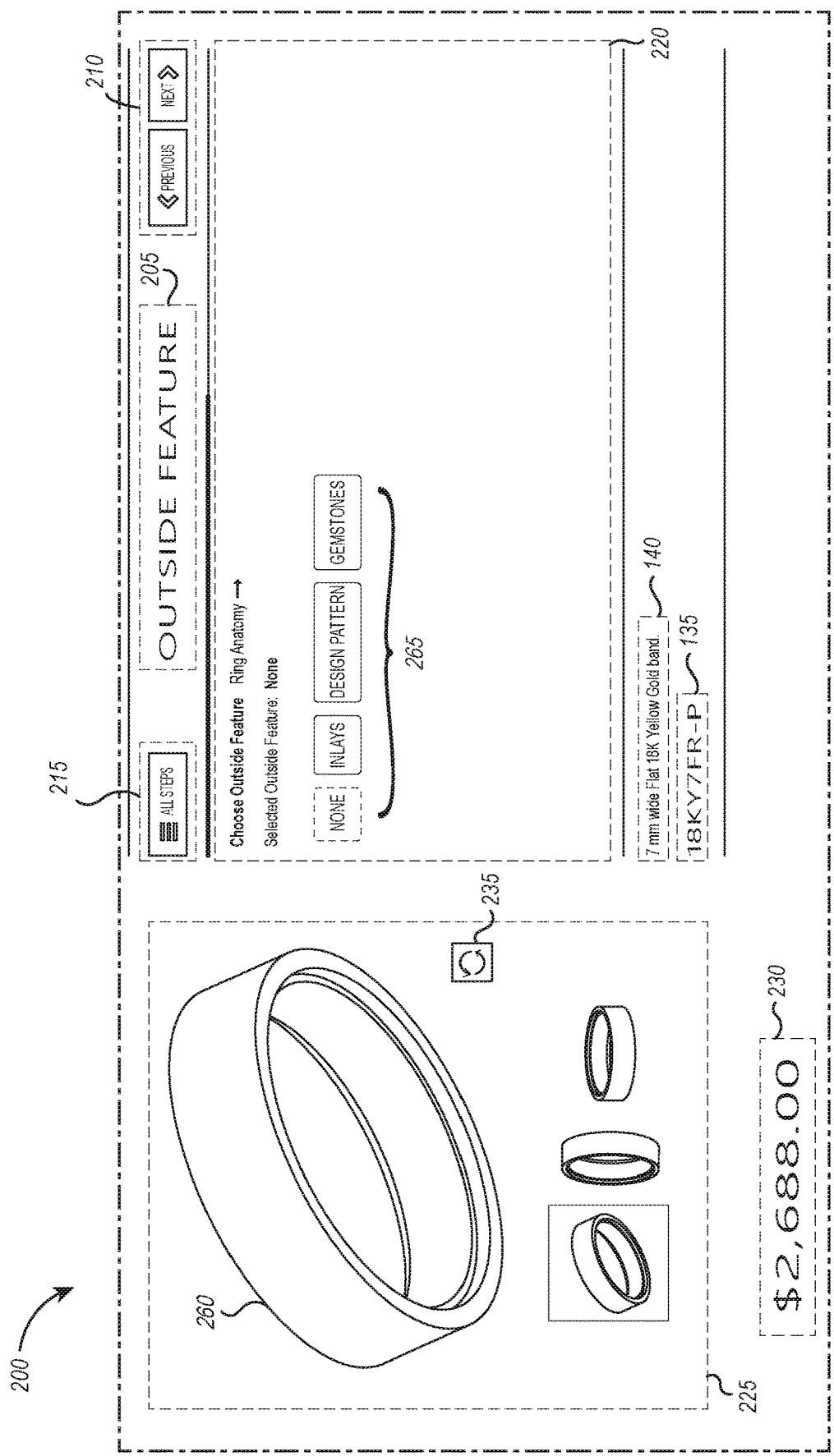
FIG. 2A shows an exemplary user interface displaying customization options.
Figure 2B:
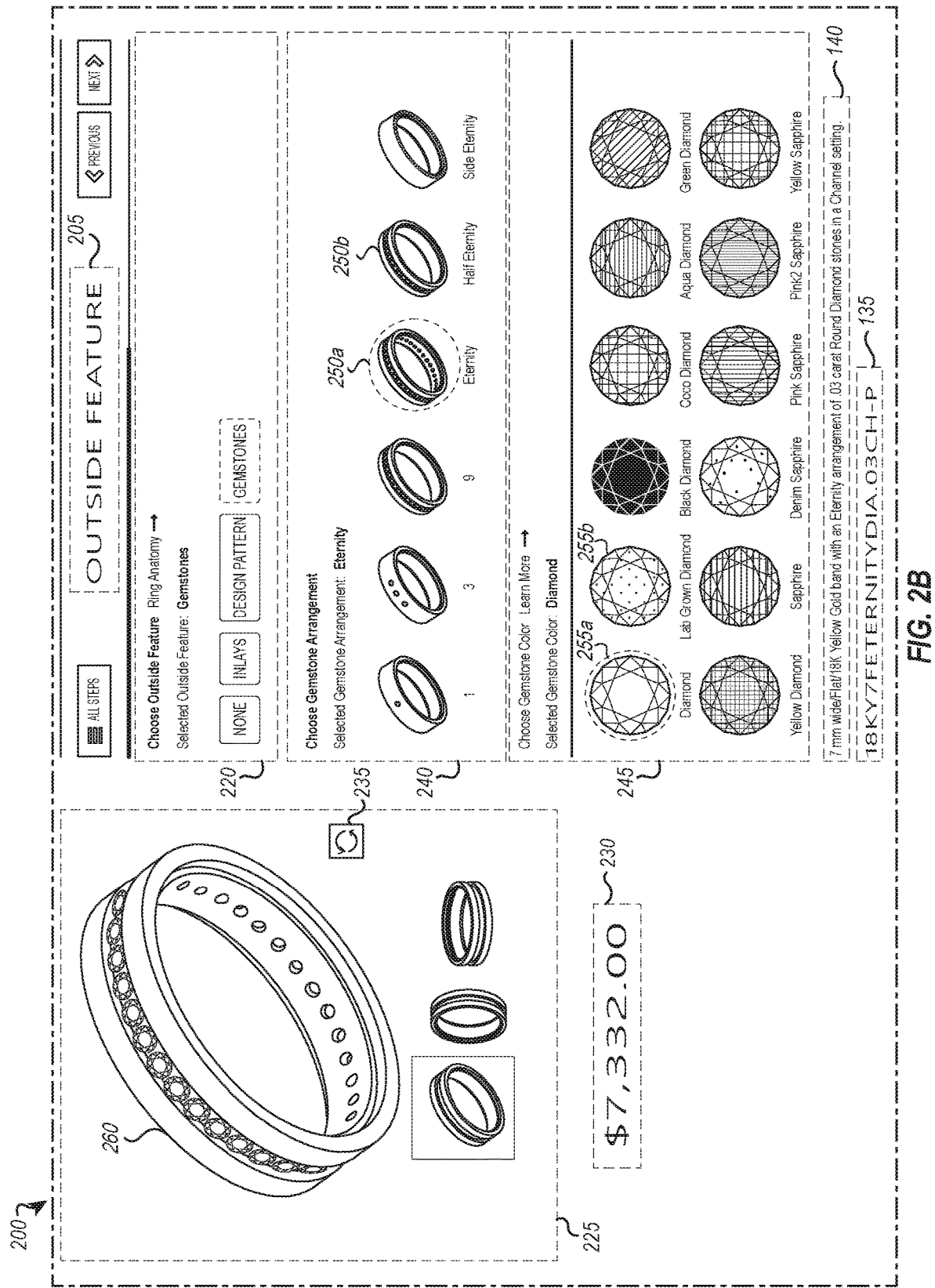
FIG. 2B shows an alternative exemplary user interface displaying customization options than those shown in FIG. 2A.

The custom jewelry design software 112 can also be configured to provide a price estimate 230 based on the user selection of the at least one available selection for the customization option and the at least one available selection for the additional customization option (shown in FIGS. 2A and 2B). For example, as shown in FIG. 1, following the user's selection of at least one available selection for the customization option, data regarding the user's selection can be sent from the user-interface module 115 to the processing module 120. The processing module 120 can access the price database 130 to generate the price estimate 230 using price per weight measurements for the materials used to create the user's selection of the at least one available selection for the customization option.

The processing module 120 can send the price estimate 230 to the user-interface module 115. The user interface 200 can send display instructions 106 for the price estimate 230 so the user can see how much the selected available selection(s) cost (shown in FIG. 2A). Additionally or alternatively, the processing module 120 can send the price estimate 230 to the computer system 102 directly.

Following the user's selection of the at least one available selection for the additional customization option, data regarding the user's selection can again be sent from the user-interface module 115 to the processing module 120. The processing module 120 can access the price database 130 to generate an updated price estimate 230 based on the user selection of the additional customization option (shown in FIG. 2B). In at least one implementation, the processing module 120 retrieves, from the price database 130, real-time price per weight measurements for the materials used to create the user's selection of the at least one available selection for the customization option and the at least one available selection for the additional customization option.

As with the price estimate 230 based on the user's selection of the at least one available selection for the customization option, the processing module 120 can send the updated price estimate 230 based on the user's selection of the at least one available selection for the additional customization option to the user-interface module 115. The user-interface module 115 can send display instructions for the updated price estimate 230 so the user can see how much the selected available selection(s) cost (shown in FIG. 2B). Additionally or alternatively, the processing module 120 can send the updated price estimate 230 to the computer system 102 directly.

FIG. 1 also shows that the custom jewelry design software 112 can be in communication with a custom manufacturer 145. In at least one implementation, the custom jewelry design software is in communication with the custom manufacturer via a network connection 110. The customization of a piece of jewelry can eventually result in a stock keeping unit ("SKU") 135 generated by the processing module 120. The SKU 135 can be associated with the user's selections of the available selections for each customization option. Additionally, the processing module 120 can generate primary properties 140 associated with the user's selections of the available selections for each customization option.

As shown in FIG. 1, the processing module 120 can be configured to send the SKU 135 and primary properties 140 to the custom manufacturer 145. Additionally or alternatively, the processing module 120 can be configured to send the SKU 135 and primary properties 140 to the user-interface module 115. The user-interface module 115 can display the SKU 135 and primary properties 140 so the user can see the SKU 135 and primary properties 140. The user-interface module 115 can also be configured to send the SKU 135 and primary properties 140 to the custom manufacturer 145. In at least one implementation, the SKU 135 and primary properties 140 are sent from the custom jewelry design software 112 to the custom manufacturer 145 via the network connection 110. The custom manufacturer can use the SKU 135 and/or primary properties 140 to create the piece of jewelry.

In at least one implementation of the present invention, the SKU 135 and primary properties 140 are first generated based on the user's selection of the at least one available selection for the customization option. The processing module 120 can be configured to update the SKU 135 and primary properties 140 based on the user's subsequent selection of the at the at least one available selection for the additional customization option. Accordingly, the processing module 120 or user-interface module 115 can be configured to send the updated SKU 135 and the updated primary properties 140 to the custom manufacturer 145.

FIG. 2A shows an exemplary user interface 200 of the custom jewelry design software application of the user-interface module 115. The user interface 200 can guide the user through the step-by-step customization process by displaying customization options and allowing the user to make a selection from the available selections for the customization options. As shown in FIG. 2A, the user interface 200 can include a customization option indication 205 that displays the customization option or a customization option grouping for which the user is shown available selections. The customization option grouping can describe a common element between the customization options. For example, the customization option indication 205 can read "DIMENSION" for an interface displaying the available selections for the customization options "ring weight," "ring width," and "ring size." In FIG. 2A, the customization option indication 205 is "OUTSIDE FEATURE," however, the user interface 200 can display any customization option or customization option grouping offered to the user.

The user interface 200 can also include navigation control 210 that advances or moves back the step-by-step customization process. For example, the navigation control 210 can allow the user to move to the next customization option in the step-by-step customization process, or it can allow to go back to a previously displayed customization option in the step-by-step customization process. Additionally or alternatively, the user interface 200 can include map control 215 that directs the user to an interface that displays all customization options in the step-by-step customization process.

As shown in FIG. 2A, the user interface 200 can display the customization options 265 within a customization area 220. Although a single customization option area 220 for the customization option "Outside Feature" is shown in FIG. 2A, the invention is not so limited. For example, for a user interface wherein a customization option grouping is displayed within customization option indication (e.g., "DIMENSION") at least three customization option areas 220 can be displayed, one for each of the customization options (e.g., "ring weight," "ring width," and "ring size").

In FIG. 2A, the user selected "none" as the available selection for the customization option, so the product photo area 225 shows the product photo 260 with no outside features (e.g., no inlays, design patterns, or gemstones). The product photo area 225 can allow the user to view the product photos of the piece of jewelry from multiple angles, as shown in FIG. 2A. One skilled in the art will appreciate that the product photo area 225 is not limited to the specific views nor the number of views shown in FIG. 2A. Further, the customization options 265 within the customization area 220 are merely exemplary and in no way limit the present invention.

In at least one implementation, the product photo area 225 includes a refresh button 235. When the user presses the refresh button 235, the custom jewelry design software 112 can replace the product photo with an alternative product photo showing natural variations in materials (see FIGS. 3A-3B). Additionally or alternatively, the custom jewelry design software 112 can be configured to replace a product photo with an alternative product photo showing natural variations in materials when the user selects the at least one available selection for the additional customization option.

FIG. 2A also shows that the user interface 200 can display the price estimate 230, the SKU 135, and primary properties 140. The SKU 135 can be a unique code that identifies the user's selections of the available selections for the customization options. Similarly, the primary properties 140 can concisely identify the user's selections of the available selections for the customization options. One skilled in the art will appreciate that the SKU 135 and primary properties 140 are not limited to the format shown in FIG. 2A. Further, the price estimate 230, SKU 135, and primary properties 140 are not limited to the placement within the user interface 200 shown in FIG. 2A.

FIG. 2B shows the user interface 200 of FIG. 2A wherein the user selected an alternative available selection. In FIG. 2B, the user selected "GEMSTONES" within the customization area 220. Based on the user's selection within the customization area 220, the user interface 200 can further display at least one secondary customization area. In FIG. 2B, a first secondary customization area 240 and a second secondary customization area 245 is shown. In at least one implementation, no secondary customization area is shown. Instead, available selections for the customization option are displayed without further categorization. In at least one implementation, customization options can be further divided.

The first secondary customization area 240 shows the available selections 250a and 250b for "Gemstone Arrangement." As shown, the user selected the available selection 250a (an "Eternity" arrangement). FIG. 2B also shows that the second secondary customization area 245 shows the available selections 255a and 255b for "Gemstone Color." The user selected the available selection 255a (a "Diamond"). The present invention is not limited to the secondary customization areas 240 and 245 shown, nor the available selections shown within the secondary customization areas 240 and 245. FIG. 2B is merely exemplary and not limiting. For example, additional secondary customization areas can be shown (e.g., for "Gemstone Shape," "Gemstone Size," "Gemstone Setting Style," etc.).

As shown in FIG. 2B, the product photo area 225 shows the updated product photo 260 with the available selections 250a and 255a. Further, the price estimate 230, the SKU 135 and the primary properties 140 are updated to reflect the user's selections of the available selections 250a and 255a. The price estimate 230, the SKU 135, and the primary properties 140 shown in FIG. 2B are merely exemplary and in no way limit the present invention.

As in FIG. 2A, FIG. 2B shows that the product photo area 225 can include the refresh button 235. When the user presses the refresh button 235, the custom jewelry design software 112 can replace the product photo with an alternative product photo showing natural variations in materials (see FIGS. 3A-3B). Additionally or alternatively, the custom jewelry design software 112 can be configured to replace a product photo with an alternative product photo showing natural variations in materials when the user selects the at least one available selection for the additional customization option.

Figure 3A:
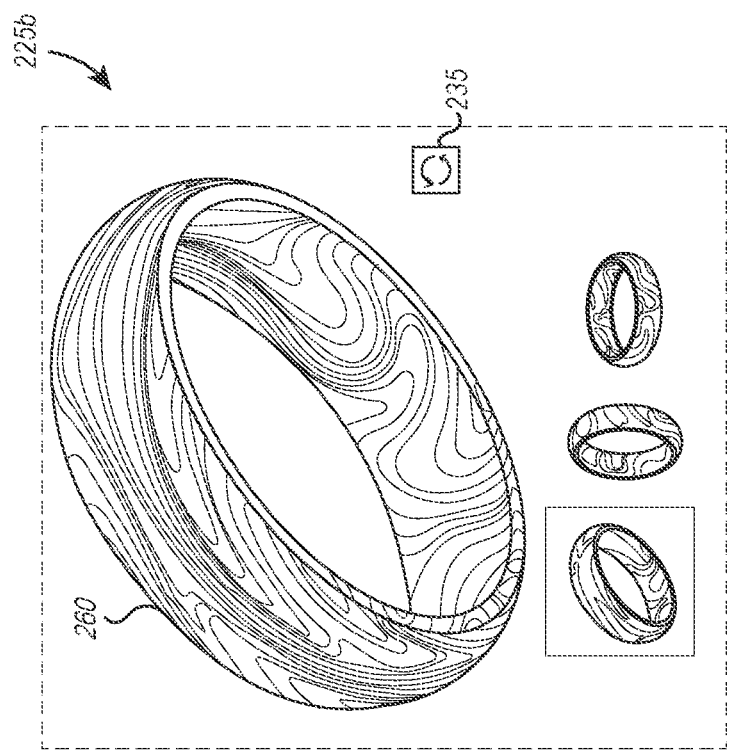
FIG. 3A shows a natural variation possible with a certain available selection.
Figure 3B:
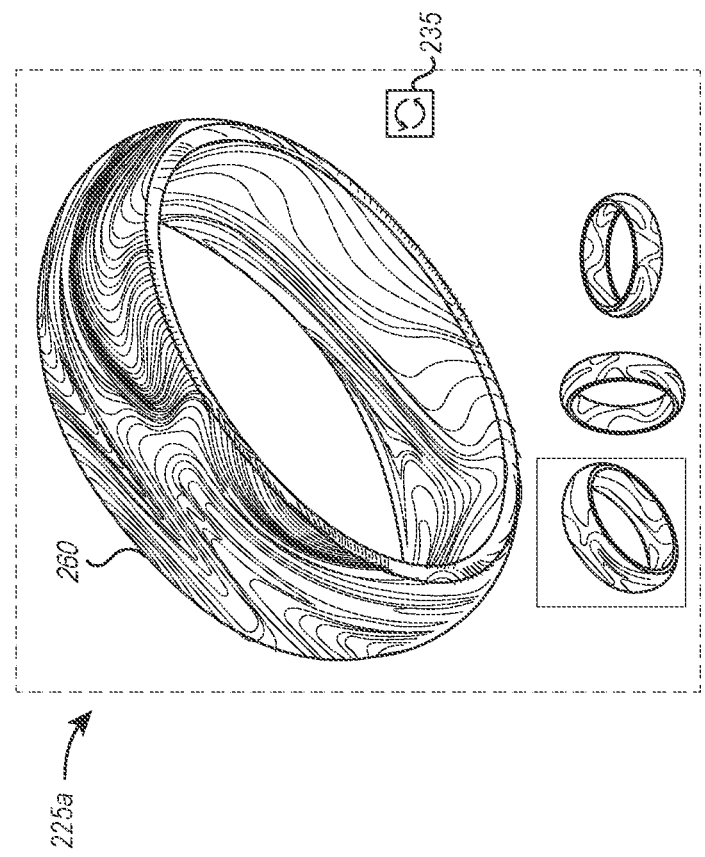
FIG. 3B shows an alternative natural variation possible with a certain available selection from that shown in FIG. 3A.

FIGS. 3A and 3B show the product photo area 225a before the refresh button 235 is pressed, and the product photo area 225b after the refresh button 235 is pressed. As shown in FIGS. 3A and 3B the product photo area 225b shows a product photo 260 with the same available selections for customization options as the product photo area 225a, but with alternative natural variations in the material. The present invention is not limited to the natural variations shown in FIGS. 3A and 3B.

For available selections comprising natural variations, the image cache 114 can store multiple images for an available selection. The custom jewelry design software 112 can be configured to replace a product photo with an alternative product photo showing alternative natural variations in materials when the user presses the refresh button 235 or selects the at least one available selection for the additional customization option. In at least one implementation, the image cache 114 can replace an image of the at least one available selection within a product photo 260 layering assembly with an alternative image of the same available selection to show natural variation.

Figure 4A:
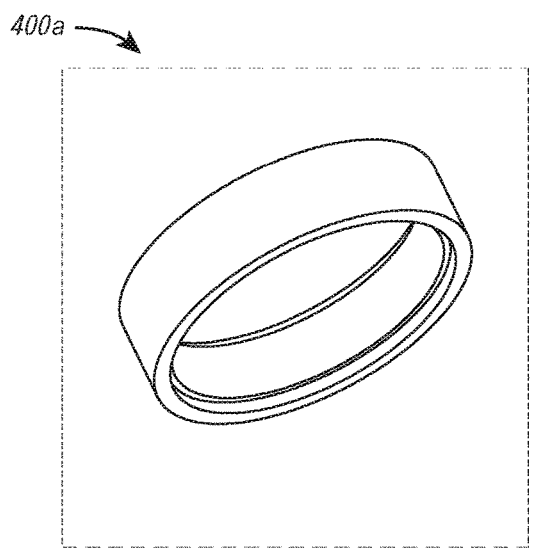
FIG. 4A shows an edited photo.
Figure 4B:
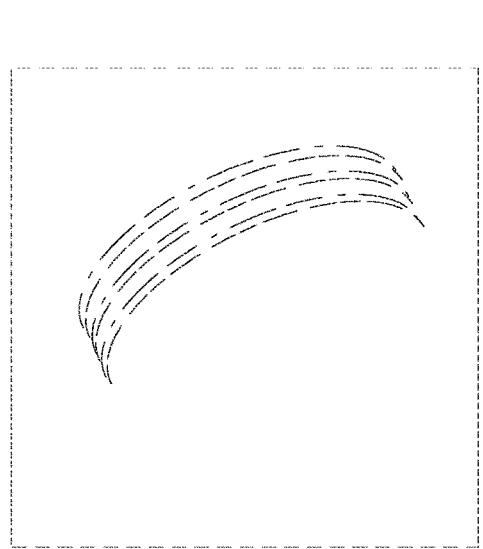
FIG. 4B shows an alternative edited photo to that shown in FIG. 4A.
Figure 4C:
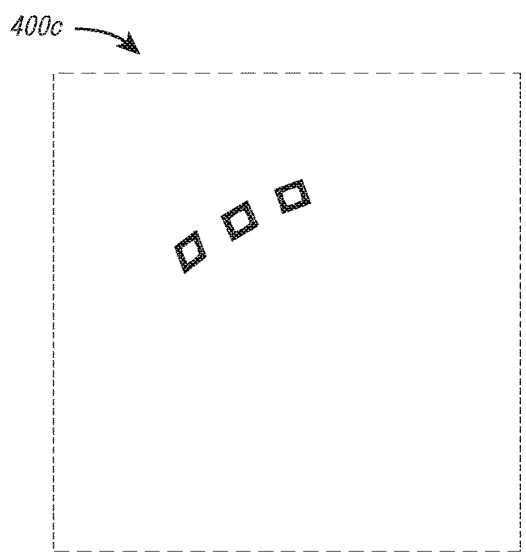
FIG. 4C shows an alternative edited photo to that shown in FIGS. 4A-4B

FIGS. 4A-4C show exemplary edited photos 400*a-c* comprising at least one available selection. For example, FIG. 4A illustrates an edited photo 400*a* comprising one available selection for the material customization option (e.g., "18K yellow gold"). Additionally, the edited photo 400*a* can comprise one available selection for the profile customization option (e.g., "flat"), the ring weight customization option (e.g., "premium"), and ring width customization option (e.g., "7 mm").

As shown, FIG. 4B shows an edited photo 400*b* comprising one available selection for the finish customization option (e.g., "satin"). Similarly, an edited photo 400*c* shown in FIG. 4C comprises one available selection within the outside feature customization option (e.g., "gemstones"). Additionally, the edited photo 400*c* comprises one available selection option for the secondary customization options gemstone arrangement (e.g., "eternity") and gemstone color (e.g., diamond), gemstone shape (e.g., "princess"), gemstone size (e.g., "0.06 carat"), and gemstone setting style (e.g., "bezel"). As shown, edited photos can comprise an available selection for a single customization option, or available selections for multiple customization options.

Figure 4D:
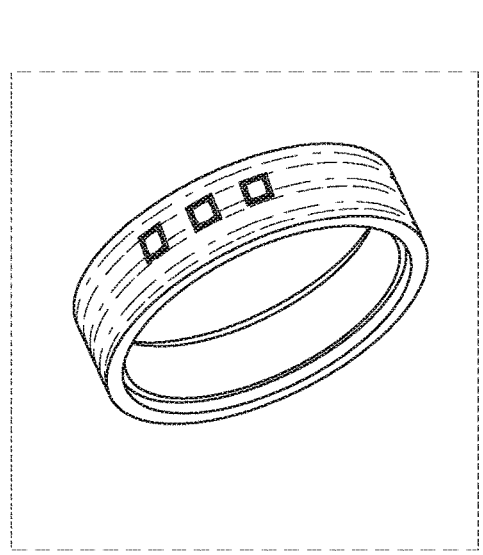
FIG. 4D shows a product photo comprising the edited photos shown in FIGS. 4A-4C.

FIG. 4D shows a product photo 260 created by layering the edited photos 400*a*-400*c*. As shown, the product photo 260 comprises the visual elements of the three edited photos 400*a*-400*c*. One skilled in the art will appreciate the available options and customizations options in FIGS. 4A-4D are merely exemplary and in no way limit the present invention. Additionally, any number of edited photos can be stitched to produce a product photo 260. For example, 1 to 50 edited photos can be stitched to produce a product photo 260.

Figure 5:
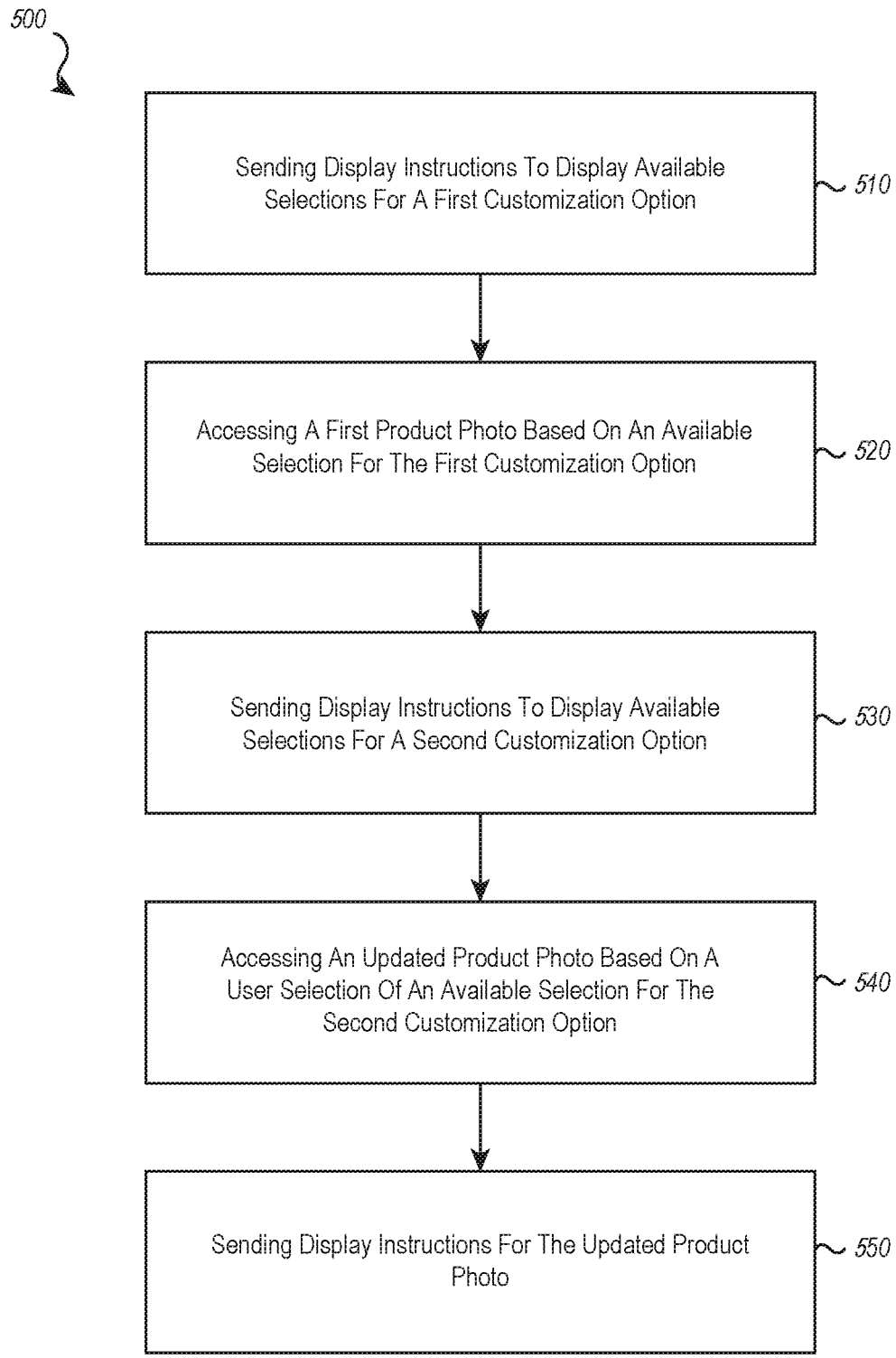
FIG. 5 illustrates a flow chart of a series of acts in a method for generating custom jewelry through a step-by-step process.

FIG. 5 illustrates a method 500 for generating custom jewelry through a step-by-step process. As shown in FIG. 5, Act 510 comprises sending display instructions to display available selections for a first customization option. Act 510 includes sending display instructions over a network to display a plurality of available selections for a first customization option at a remote computer system. For example, as shown in FIGS. 2A and 2B, the user interface 200 can include a customization option indication 205 that displays the customization option for which the user is shown available selections. Additionally, the user interface 200 can display secondary customization options. For each customization option, the user interface 200 can display at least one available selection.

FIG. 5 also shows Act 520 comprises accessing a first product photo based on an available selection for the first customization option. Act 520 includes accessing a first product photo based on a user selection at the remote computer system of an available selection for the first customization option. As described above, following the user's selection of at least one available selection for the customization option, data regarding the user's selection can be sent from the user-interface module 115 to the processing module 120. The processing module 120 can communicate with the image cache 114 to access the product photo based on the user selection of the at least one available selection for the customization option.

Further, Act 530 comprises sending display instructions to display available selections for a second customization option. Act 530 includes sending display instructions over a network to display a plurality of available selections for a second customization option at the remote computer system. As shown in FIG. 1, the processing module 120 can send the product photo to the user-interface module 115. The user-interface module 115 can send display instructions 106 for the product photo 260 to the computer system 102 so the user can see how the selected available selection(s) would look as a piece of jewelry. Additionally or alternatively, the processing module 120 can send display instructions 106 for the product photo 260 to the computer system 102 directly.

FIG. 5 shows that Act 540 comprises accessing the updated product photo based on a user selection of an available selection for the second customization option. Act 540 includes accessing an updated product photo based on a user selection at the remote computer system of an available selection for the second customization option, wherein the available selection for the second customization option corresponds to a second product photo, and the updated product photo combines at least a portion of the first product photo and at least a portion of the second product photo so that the updated product photo appears to be an original photo.

FIG. 1 shows that following the user's selection of at least one available selection for the additional customization option, data regarding the user's selection can again be sent from the user-interface module 115 to the processing module 120. The processing module 120 can communicate with the image cache 114 to access an updated product photo 260 based on the user selection of the at least one available selection for the additional customization option (shown in FIG. 2B). The image cache 114 can include edited photos comprising a single available selection for a customization option and edited photos comprising multiple available selections for multiple customization options. Therefore, the updated product photo 260 can comprise a single edited photo comprising the requested at least one available selection for the customization option and the requested at least one available selection for the additional customization option.

The at least one available selection for the additional customization option can correspond to a second product photo. Accordingly, the updated product photo 260 based on the user selection of the at least one available selection for the additional customization option can combine at least a portion of the first product photo and at least a portion of the second product photo so that the updated product photo appears to be an original photo. In other words, the updated product photo 260 can comprise multiple stitched edited photos each comprising an element of the requested at least one available selection for the customization option and/or the requested at least one available selection for the additional customization option.

Finally, Act 550 comprises sending display instructions for the updated product photo. Act 550 includes sending over the network display instructions to the remote computer system of the updated product photo. As with the product photo 260 based on the user's selection of the at least one available selection for the customization option, the processing module 120 can send the updated product photo 260 based on the user's selection of the at least one available selection for the additional customization option to the user-interface module 115. The user-interface module 115 can send over the network 110 display instructions 106 for the updated product photo 260 to the computer system 102 so the user can see how the selected available selection(s) would look as a piece of jewelry. Additionally or alternatively, the processing module 120 can send display instructions for the product photo 260 to the computer system 102 directly.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention can comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or servers and/or modules and/or other electronic devices. When information is transferred or provided over a network or another communications connection (either hardwired, wireless, or a combination of hardwired or wireless) to a computer system, the computer system can view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions can be, for example, binaries, intermediate format instructions such as assembly language, or even source code.

Those skilled in the art will appreciate that the invention can be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention can also be practiced in distributed system environments where local and remote computer systems, which are linked (either by hardwired data links, wireless data links, or by a combination of hardwired and wireless data links) through a network, both perform tasks. As such, in a distributed system environment, a computer system can include a plurality of constituent computer systems. In a distributed system environment, program modules can be located in both local and remote memory storage devices.

Those skilled in the art will also appreciate that the invention can be practiced in a cloud-computing environment. Cloud computing environments can be distributed, although this is not required. When distributed, cloud computing environments can be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model can also come in the form of various service models such as, for example, Software as a Service ("SaaS"), Platform as a Service ("PaaS"), and Infrastructure as a Service ("IaaS"). The cloud-computing model can also be deployed using different deployment models such as private cloud, community cloud, public cloud, hybrid cloud, and so forth.

In at least one implementation, such as a cloud-computing environment, can comprise a system that includes one or more hosts that are each capable of running one or more virtual machines. During operation, virtual machines emulate an operational computing system, supporting an operating system and perhaps one or more other applications as well. In at least one implementation, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A server in a network comprising one or more remote client computer systems, the server configured for generating custom jewelry through a step-by-step customization process, comprising:
   one or more processors; and
   one or more computer-readable media having stored thereon executable instructions that when executed by the one or more processors configure the server to perform at least the following:
      send display instructions over a network to display a first plurality of available selections for a first customization option at a remote computer system;
      receive, from the remote computer system, a first user selection of a first available selection of the first plurality of available selections for the first customization option;
      access a first cached product photo based on the first user selection, the first cached product photo depicting a first visual element of the first available selection for the first customization option;
      send display instructions over a network to display a second plurality of available selections for a second customization option at the remote computer system;
      receive, from the remote computer system, a second user selection of a second available selection of the second plurality of available selections for the second customization option;
      access a second cached product photo based on the second user selection, the second cached product photo depicting a second visual element of the second available selection for the second customization option;
      perform a layering operation to generate an updated product photo, wherein the layering operation comprises:
         determining, based on a predetermined layering protocol, an order in which to layer the second visual element of the second cached product photo with the first visual element of the first cached product photo; and
         layering the second visual element of the second cached product photo with the first visual element of the first cached product photo in accordance with the predetermined layering protocol,
      wherein the updated product photo displays the second visual element and partially displays the first visual element, the second visual element being overlaid on the first visual element, the updated product photo depicting a photo realistic representation of a piece of custom jewelry that was not formally photographed; and
      send over the network display instructions to cause the remote computer system to display the updated product photo.

2. The server of claim 1, wherein the server is further configured to:
   generate a price estimate based on the first user selection at the remote computer system of the first available selection for the first customization option; and
   update the price estimate based on the second user selection at the remote computer system of the second available selection for the second customization option.

3. The server of claim 2, wherein the price estimate is calculated based on real-time prices of materials.

4. The server of claim 1, wherein server is further configured to:
   generate a SKU based on the first user selection at the remote computer system of the first available selection for the first customization option; and
   update the SKU based on the second user selection at the remote computer system of the second available selection for the second customization option.

5. The server of claim 4, wherein the server is further configured to send the SKU to a custom manufacturer remotely over the network.

6. The server of claim 1, wherein the server is further configured to deliver a list of primary properties to a custom manufacturer.

7. The server of claim 6, wherein the list of primary properties includes the first user selection at the remote computer system of the first available selection for the first customization option and the second user selection at the remote computer system of the second available selection for the second customization option.

8. The server of claim 1, wherein the updated product photo is further updated to show natural variations in a material associated with the first available selection or the second available selection in response to receiving user input directed to a refresh button at the remote computer system.

9. The server of claim 1, wherein the first visual element depicts a ring.

10. The server of claim 9, wherein the first customization option comprises a material customization option, a profile customization option, or a dimension customization option.

11. The server of claim 10, wherein the second customization option comprises a finish customization option or an outside feature customization option.

12. The server of claim 11, wherein the second visual element depicts an isolated representation of a finish or an outside feature.

13. A computerized method implemented at a server on a network comprising the server and one or more remote computer systems, the server further comprising one or more processors and one or more computer-readable media having stored thereon executable instructions that, when executed by the one or more processors, cause the server to perform the computerized method of generating custom jewelry through a step-by-step customization process, the computerized method comprising:
   providing display instructions to a remote computer system over a network to display at least a first customization option comprising a first plurality of available selections;
   receiving, from the remote computer system, a first user selection of a first available selection of the first plurality of available selections for the first customization option;
   upon receiving the first user selection, accessing a first cached product photo based on the first user selection, the first cached product photo depicting a first visual element of the first available selection for the first customization option;
   filtering at least one available selection option of at least a second customization option based on the first user selection to limit the second customization option to a second plurality of available selections;
   providing display instructions to display the second plurality of available selections;

receiving, from the remote computer system, a second user selection of a second available selection of the second plurality of available selections for the second customization option;

accessing a second cached product photo based on the second user selection, the second cached product photo depicting a second visual element of the second available selection for the second customization option;

performing a layering operation to generate an updated product photo, wherein the layering operation comprises:

determining, based on a predetermined layering protocol, an order in which to layer the second visual element of the second cached product photo with the first visual element of the first cached product photo; and layering the second visual element of the second cached product photo with the first visual element of the first cached product photo in accordance with the predetermined layering protocol, wherein the updated product photo displays the second visual element and partially displays the first visual element, the updated product photo depicting a photo realistic representation of a piece of custom jewelry that was not formally photographed; and providing display instructions to display the updated product photo.

14. The computerized method of claim 13, further comprising:

generating a SKU based on the first user selection of the first available selection for the first customization option; and updating the SKU based on the second user selection of the second available selection for the second customization option.

15. The computerized method of claim 14, further comprising delivering the SKU to a custom manufacturer.

16. The computerized method of claim 13, further comprising delivering a list of primary properties to a custom manufacturer.

17. The computerized method of claim 16, wherein the list of primary properties includes the first user selection of the first available selection for the first customization option and the second user selection of the second available selection for the second customization option.

18. The computerized method of claim 13, wherein the updated product photo is further updated to show natural variations in a material associated with the first available selection or the second available selection in response to receiving user input directed to a refresh button at the remote computer system.

19. A server comprising one or more processors and one or more computer-readable media having stored thereon executable instructions that when executed by the one or more processors configure the server to perform a method of generating custom jewelry through a step-by-step customization process, the method comprising:

providing display instructions to display at least a first customization option comprising a first plurality of available selections;

receiving, from a remote computer system, a first user selection of a first available selection of the first plurality of available selections for the first customization option;

accessing a first cached product photo based on the first user selection, the first cached product photo depicting a first visual element of the first available selection for the first customization option;

generating a price estimate based on the first user selection;

providing display instructions to display a second plurality of available selections for a second customization option;

receiving, from the remote computer system, a second user selection of a second available selection of the second plurality of available selections for the second customization option;

accessing a second cached product photo based on the second user selection, the second cached product photo depicting a second visual element of the second available selection for the second customization option;

performing a layering operation to generate an updated product photo, wherein the layering operation comprises:

determining, based on a predetermined layering protocol, an order in which to layer the second visual element of the second cached product photo with the first visual element of the first cached product photo; and layering the second visual element of the second cached product photo with the first visual element of the first cached product photo in accordance with the predetermined layering protocol, wherein the updated product photo displays the second visual element and partially displays the first visual element, the updated product photo depicting a photo realistic representation of a piece of custom jewelry that was not formally photographed;

updating the price estimate based on the second user selection;

providing display instructions to display the updated product photo; and providing display instructions to display the updated price estimate.

20. The server as recited in claim 19, wherein the price estimate is calculated based on real-time prices of materials.

* * * * *